July 3, 1923.

J. H. GRUBE

TUBE CASING

Filed July 22, 1921

INVENTOR
JOHN H. GRUBE;
BY
R. S. Berry
ATTORNEY

July 3, 1923.
J. H. GRUBE
TUBE CASING
Filed July 22, 1921
1,460,794
2 Sheets-Sheet 2
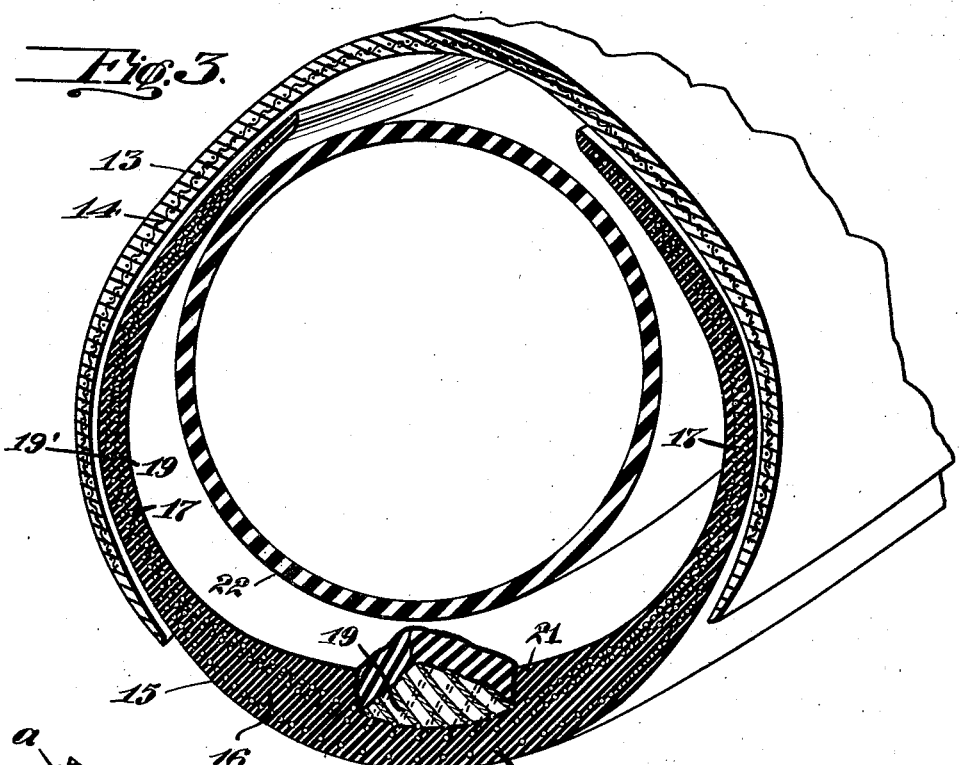
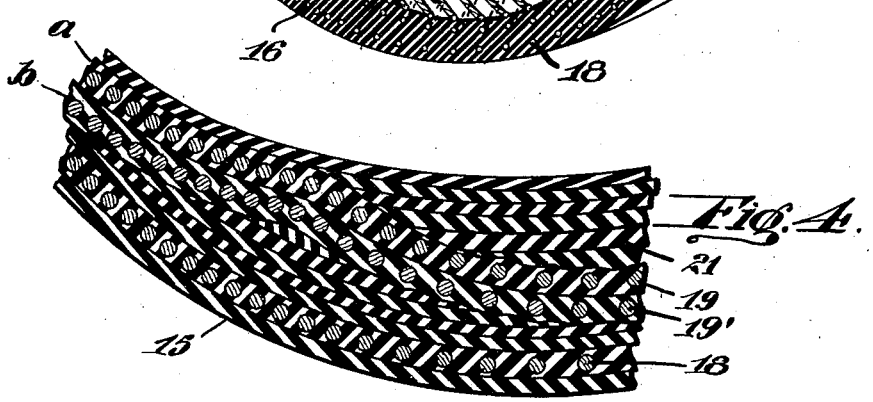
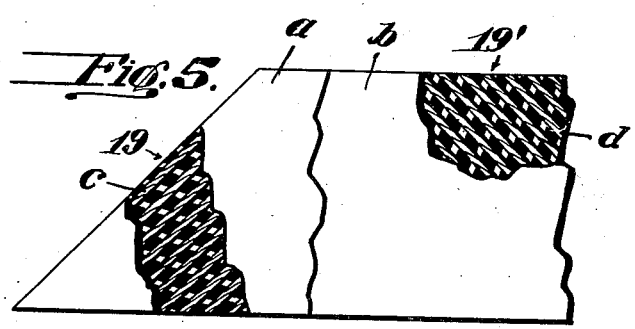
Inventor
JOHN H. GRUBE
BY R. S. Berry
Attorney Patented July 3, 1923.

1,460,794

UNITED STATES PATENT OFFICE.

JOHN H. GRUBE, OF LOS ANGELES, CALIFORNIA, ASSIGNOR TO GRUBE AUTO & TIRE SPECIALTIES CORP'N, OF PHOENIX, ARIZONA, A CORPORATION OF ARIZONA.

TUBE CASING.

Application filed July 22, 1921. Serial No. 486,698.

*To all whom it may concern:*

Be it known that I, JOHN H. GRUBE, a citizen of the United States, residing at Los Angeles, in the county of Los Angeles and State of California, have invented new and useful Improvements in Tube Casings, of which the following is a specification.

My invention relates generally to pneumatic tires, and more particularly to a protective sheath that is designed to be positioned within the tire casing and to wholly enclose the inflatable inner tube, the principal objects of my invention being to generally improve upon the existing types of pneumatic tires and to provide a relatively simple structure that will be effective in materially increasing the strength and resiliency of the tire and at the same time reducing to a minimum, the possibility of deflation of the inner tube from any of the well known causes, such as blow-outs, punctures, or "bleeding", as a result of pinching of the tube between the rim and the beads of the casing.

Further objects of my invention are, to provided a sheath, which in addition to serving as a flexible and resilient armor for the inner tube, will provide on the inner surface of the tread portion of the casing, a reinforcement in the nature of an elastic cushion that will yield readily to all movements of the body of said casing and at the same time co-operating therewith in effectively resisting service shocks and vibration, and consequently materially increasing the life or term of service of the casing; to provide a construction that will be effective in diffusing throughout a relatively wide area of elastic material, the strains and pressure that results from contact of the tread portion of the casing with a pointed object, such as an inverted V-shaped stone or pebble; to provide a sheath member that will afford ample protection to the inner tube, even though the tread portion or walls of the casing become worn completely through; further to provide a protective sheath of the character described that may be readily combined with practically all forms of casings and tubes now in general use, and further to provide a structure that may be easily and cheaply produced and which will be very effective in performing its intended functions.

With the foregoing and other objects in view, my invention consists in certain novel features of construction and arrangement of parts that will be hereinafter more fully described and claimed, and illustrated in the accompanying drawings, in which:

Figure 3 is a sectional perspective view of the sheath, and showing a partially inflated inner tube therein.

Figure 4 is an enlarged fragmentary section showing the details of construction of the tread portion of the sheath.

Figure 5 is a detail plan view partly in section of a portion of the sheath and showing the arrangement of the cord fabric therein.

Figure 1:
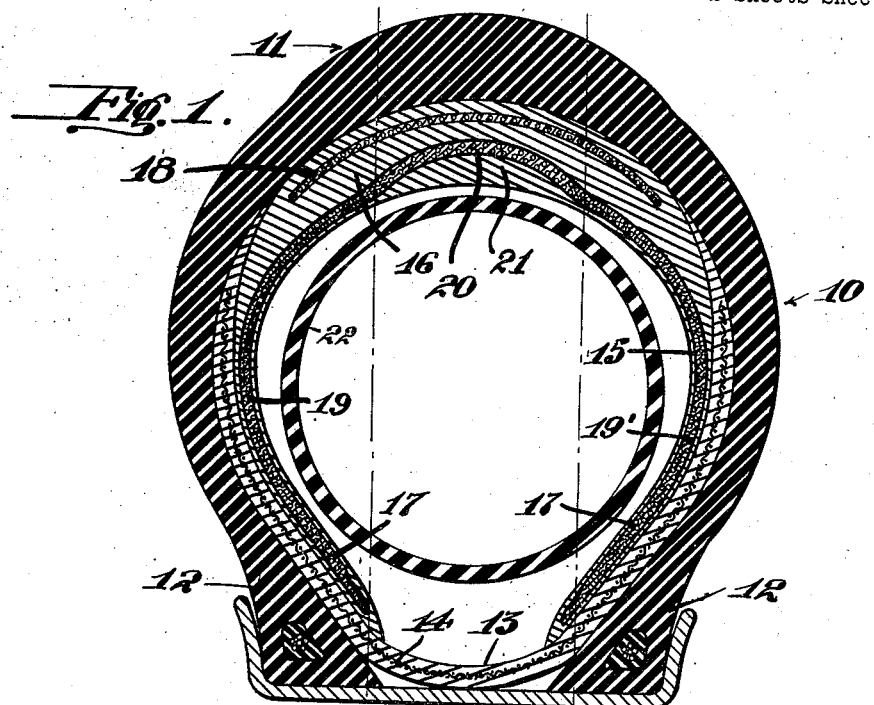
Figure 1 is a cross sectional view of a pneumatic tire and showing a protective sheath of my improved construction positioned therein.

Referring by numerals to the accompanying drawings, 10 designates a tire casing of the ordinary type and which is provided with the usual thickened tread portion 11 and the usual rim engaging beads 12.

The reinforcing and protecting sheath contemplated by my invention comprises two separately formed members, the inner one of which is positioned against the rim to which the casing is applied and against the inner faces of the side walls of said casing, and the outer member being positioned against the inner face of the tread portion of the casing and against the inner faces of the side portions of the inner member.

The inner member 13 is preferably composed of rubber in which is embedded a section of fabric 14. This inner member is substantially U-shape in cross section and of such size as to fit snugly against the inner face of the rim to which the casing is applied and with the side portions of said inner member lying directly against the inner faces of the side walls of said casing.

The outer member 15 of the protecting and reinforcing sheath is substantially of inverted U-shape in cross section and of such size that it will fit snugly against the inner face of the tread portion of the casing and with its side portions extending downwardly against the inner faces of the side portions of the inner member 13.

The body of the outer sheath member is preferably formed of rubber either molded in a single piece or of vulcanized laminated structure, as illustrated in Figure 4, and the tread portion 16 of said outer member has substantially greater thickness than the side or flap portions 17. Thus the thickened tread portion 16 of the outer member 15 of the sheath provides a cushion like member that serves to reinforce the tread portion 11 of the casing 10 and in order to materially strengthen said tread portion 16, a breaker member 18, preferably composed of cords, is embedded in its body a slight distance below its outer periphery. The cords of this breaker strip are diagonally disposed with respect to the medial plane of the outer sheath member and owing to the transverse and circumferential curvatures of said outer member the cords of said breaker member are spaced further apart at the center of said member than at the sides thereof. (See Figures 1 and 4).

Embedded in the inner portion of the body of the outer sheath member and extending downwardly through the side portions 17 are two layers or sections of cord fabric 19. The intermediate portions 20 of these sections of cord fabric are extended into the tread portion of the outer sheath member, thereby forming directly beneath the breaker strip 18 a transversely disposed curved portion of the fabric, the radius of which is substantially less than that of the inner surface of the outer sheath member, and as a result of such construction a crescent shaped section of rubber 21 is formed on the inner periphery of said outer sheath member and which crescent shaped section extends throughout the entire circumference of said outer member.

When the co-operating sheath members constructed as described are properly combined and positioned within a casing they provide a very strong and substantial reinforcement for said casing and at the same time they afford a very effective protective armor or sheath for the enclosed inflatable tube.

Both members of the sheath flex and yield readily to all movements of the casing and the pressure of a relatively sharp edge or point upon any portion of the tread surface of the casing will be distributed throughout a wide area of the material of which the casing and sheath are formed.

Figure 2:
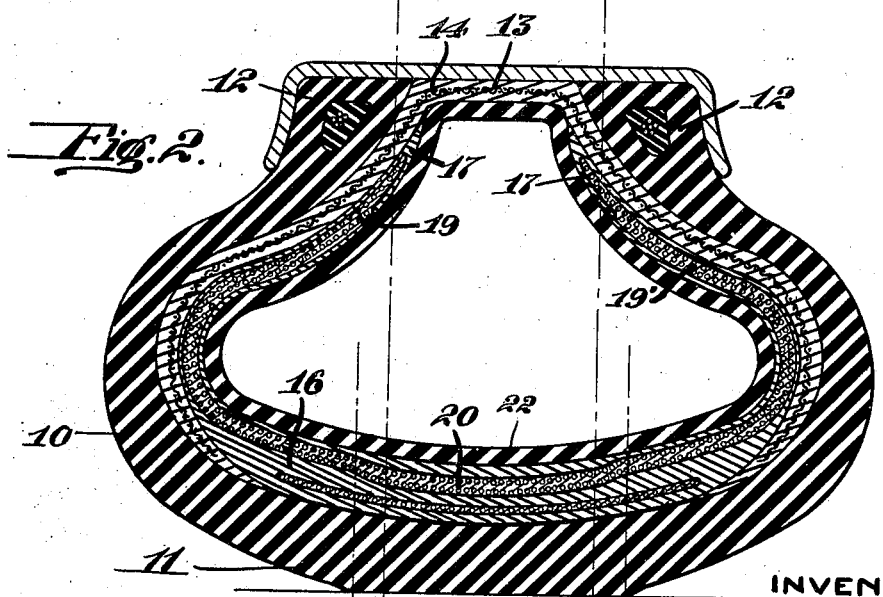
Figure 2 is a cross sectional view of a pneumatic tire with the protective sheath positioned therein, and showing said tire and sheath in the positions assumed when subjected to a relatively heavy load.

When supporting relatively heavy loads, the tendency of the tire is to flatten out, as illustrated in Figure 2; and under such conditions the tread portion 16 of the outer sheath member, and particularly the arched central portion 20 of the cord fabric, and the crescent shaped body 21 will readily stretch transversely, thereby conforming to the abnormal conditions without tearing any part of the outer sheath, and particularly that portion thereof that is subject to the greatest lateral deflection.

Thus it will be seen that I have provided a reinforcing and protecting sheath for pneumatic tires that possesses superior advantages in point of simplicity, durability and general efficiency.

Obviously, minor changes in the size, form and construction of the various parts of my improved sheath may be made and substituted for those herein shown and described without departing from the scope of the appended claims.

Having now described my invention and the manner of its application, what I claim and desire to secure by Letters Patent, is:—

1. The combination with a pneumatic tire casing and an inner inflatable tube, a sheath member adapted to encompass the outer periphery of the inner tube and having a thickened tread portion to lie between the inner tube and the tread portion of the outer casing, and a cord fabric reinforcement embedded in said thickened tread portion having a slack whereby said tread portion may be distended.

2. The combination with a pneumatic tire casing and its inner tube, of a sheath adapted to be positioned within the casing and to enclose said tube; said sheath comprising a pair of co-operating members that are substantially U-shape in cross section, the outer member having a thickened tread portion, and a cord fabric reinforcement embedded in said thickened tread portion and extending throughout the side portions of the outer member and across the thickened tread portion with a slack in the tread portion, whereby said tread portion may be distended.

3. The combination with a pneumatic tire casing and its inner tube of a sheath adapted to be positioned within the casing and to enclose said tube, said sheath embodying a member substantially U-shaped in cross section and having a thickened tread portion, a flexible reinforcing member embedded in said thickened tread portion and extending transversely thereacross and formed with a slack whereby the tread portion may stretch to permit distension of the tread portion, and a flexible reinforcement extending throughout the side portions of said sheath for stiffening said side portions relative to the tread portion, and whereby distension of the sheath may be confined substantially to the tread portion thereof.

4. A tube casing for pneumatic tires, comprising in association with an outer tire casing divided on its inner periphery and an inner inflatable tube, an outer sheath member for encompassing the outer periphery of the inner tube and having a thickened tread portion to lie between the inner tube and the tread portion of the outer casing, and an inner sheath member for encompassing the inner periphery of the inner tube and having side portions to extend between the side portions of the outer sheath member and those of the outer casing.

5. A tube casing for pneumatic tires, comprising in association with an outer tire casing divided on its inner periphery and an inner inflatable tube, an outer sheath member for encompassing the outer periphery of the inner tube and having a thickened tread portion to lie between the inner tube and the tread portion of the outer casing, and an inner sheath member for encompassing the inner periphery of the inner tube and having side portion to extend between the side portions of the outer sheath member and those of the outer casing; said side portions tapering to their edges and overlapping the thickened tread portion of the outer sheath member.

6. A tube casing for pneumatic tires, comprising in association with an outer tire casing divided on its inner periphery and an inner inflatable tube, an outer sheath member for encompassing the outer periphery of the inner tube and having a thickened tread portion to lie between the inner tube and the tread portion of the outer casing, and an inner sheath member for encompassing the inner periphery of the inner tube and having side portions to extend between the side portions of the outer sheath member and those of the outer casing, a fabric reinforcement embedded in the side portions of the outer sheath member and extending across the thickened tread portion thereof with the weave of the fabric spaced apart in the tread portion to permit free elastic action in the latter and with the weave of the fabric close in the side portions to resist elastic action.

7. A tube casing for pneumatic tires, comprising in association with an outer tire casing divided on its inner periphery and an inner inflatable tube, an outer sheath member for encompassing the outer periphery of the inner tube and having a thickened tread portion to lie between the inner tube and the tread portion of the outer casing, and an inner sheath member for encompassing the inner periphery of the inner tube and having side portions to extend between the side portions of the outer sheath member and those of the outer casing, and a fabric reinforcement in said outer sheath member arranged to provide the thickened tread portion with greater elasticity than the side portions.

8. In a pneumatic tire, a tubular outer casing having its inner periphery divided and adapted to be attached to a wheel rim, a rubber inner sheath member arranged within the outer casing and spanning the divided inner periphery of the latter and having side portions extending over the inner surface of each of the side portions of the casing, a second rubber sheath member of tubular form and divided on its inner periphery and formed with a thickened tread portion to lie against the inner surface of the outer casing opposite the tread surface of the latter, the side portions of said second sheath member extending over the inner surface of the side portions of the other sheath member and having soft rubber edges, and an inflatable inner tube arranged within the second sheath member.

9. In a pneumatic tire, a tubular outer casing having its inner periphery divided and adapted to be attached to a wheel rim, a rubber inner sheath member arranged within the outer casing and spanning the divided inner periphery of the latter and having side portions extending over the inner surface of each of the side portions of the casing, a second rubber sheath member of tubular form and divided on its inner periphery and formed with a thickened tread portion to lie against the inner surface of the outer casing opposite the tread surface of the latter, the side portions of said second sheath member extending over the inner surface of the side portions of the other sheath member and having soft rubber edges, an inflatable inner tube arranged within the second sheath member, and a cord fabric reinforcement embedded in said second sheath member and extending throughout the side portions thereof and across the thickened tread portion with a slack in the tread portion whereby said tread portion may have free elastic action, and with the fabric in the side portions arranged to have a stiffening effect to confine active elastic movement to the tread porton.

10. The combination with a pneumatic tire casing and its inner tube, of an annular sheath adapted to be positioned within the casing and to enclose said tube, said sheath embodying a member substantially U-shaped in cross section the connecting portions of which constitute a tread portion, a flexible reinforcing member embedded in said tread portion and extending transversely thereacross and circumferentially thereof, said reinforcing member adapted to permit stretch of the tread portion, whereby said portion may be distended, and also serving to limit distension of the tread portion, and reinforcements in the side portions of the sheath rendering same nonextensible throughout the major portion thereof.

JOHN H. GRUBE.